US005590583A

United States Patent [19]

Harrison

[11] Patent Number: 5,590,583
[45] Date of Patent: Jan. 7, 1997

[54] APPLIANCE FOR MAKING BREAD AND FOR COOKING BAGELS

[75] Inventor: Robert G. Harrison, Seattle, Wash.

[73] Assignee: PMI International Corporation, Seattle, Wash.

[21] Appl. No.: 506,294

[22] Filed: Jul. 24, 1995

Related U.S. Application Data

[63] Continuation-in-part of Ser. No. 372,518, Jan. 13, 1995, Pat. No. 5,526,734, and a continuation-in-part of Ser. No. 452,509, May 30, 1995.

[51] Int. Cl.[6] .............................. A21B 1/00; A21D 8/00; A47J 27/10; A23L 1/00
[52] U.S. Cl. .............................. 99/327; 99/339; 99/348; 99/410; 99/412; 99/468; 99/476; 99/477; 126/21 A; 219/400; 366/98; 366/146; 366/314
[58] Field of Search .............................. 99/339, 348, 404, 99/405, 410, 412, 415, 450, 476, 477, 326–334; 366/98, 314, 601, 144–146; 219/400; 126/21 A

[56] References Cited

U.S. PATENT DOCUMENTS

| 3,463,077 | 8/1969 | Lescure | 99/403 |
| 3,801,331 | 4/1974 | Sano et al. | 99/403 |
| 4,591,698 | 5/1986 | Chang | 219/400 |
| 4,672,179 | 6/1987 | Onishi et al. | 99/403 |
| 4,995,312 | 2/1991 | Leiros | 99/403 |
| 5,048,402 | 9/1991 | Letournel et al. | 366/314 |
| 5,054,383 | 10/1991 | Cho | 99/348 |
| 5,351,606 | 10/1994 | Matsuzaki | 366/146 |
| 5,402,710 | 4/1995 | Chen | 366/98 |
| 5,445,061 | 8/1995 | Barradas | 99/348 |
| 5,463,936 | 11/1995 | Clark et al. | 99/357 |

*Primary Examiner*—Timothy F. Simone
*Attorney, Agent, or Firm*—Hughes, Multer & Schacht, P.S.

[57] ABSTRACT

An appliance which includes an inner compartment with one zone in which uncooked bagels can be boiled and a second zone for subsequently baking the boiled bagels. The same appliance can also be used to make bagel doughs and to both make and bake other yeast doughs.

16 Claims, 6 Drawing Sheets

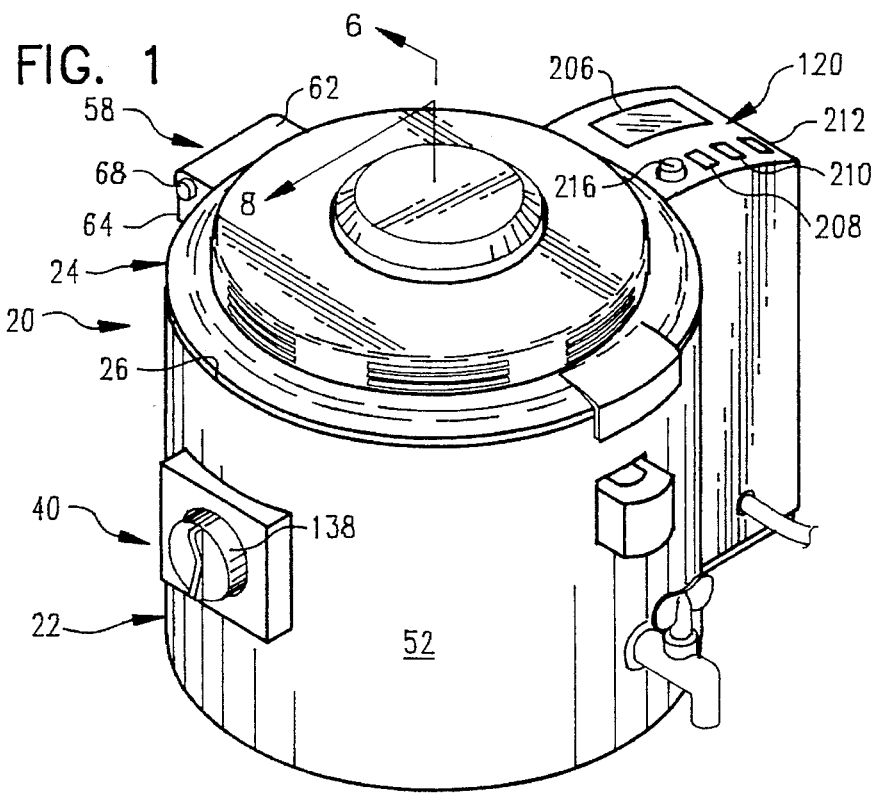
FIG. 1
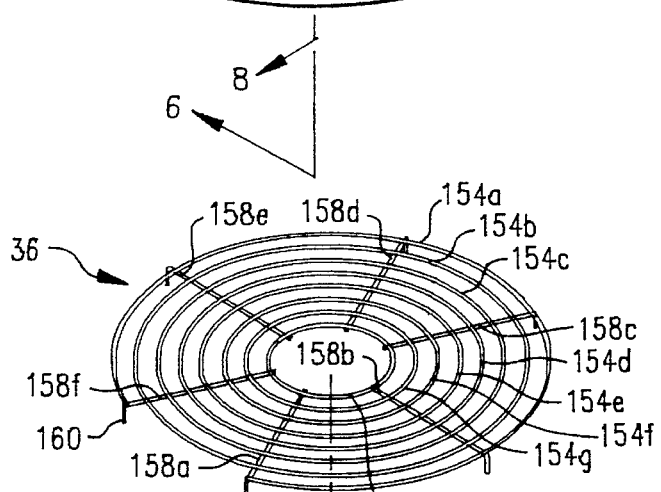
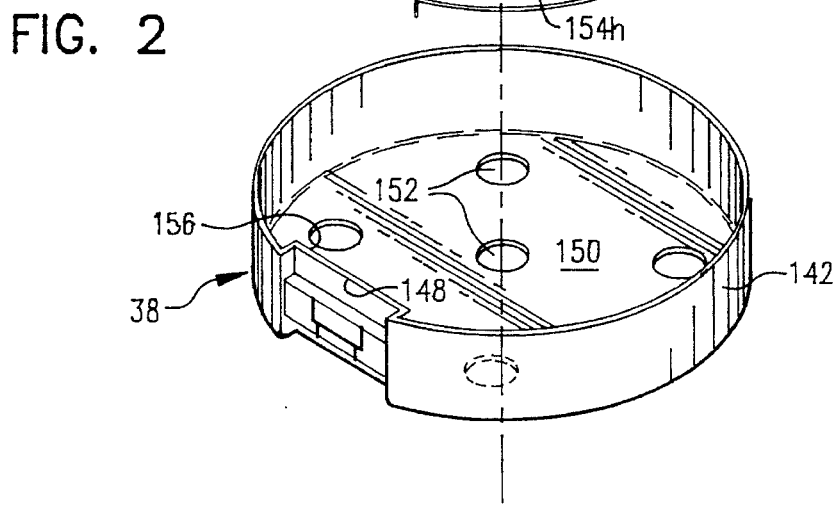
FIG. 2

APPLIANCE FOR MAKING BREAD AND FOR COOKING BAGELS

CROSS-REFERENCES TO RELATED APPLICATIONS

The present application is a continuation-in-part of application No. 08/372,518 filed 13 Jan. 1995 now U.S. Pat. No. 5,526,734 and is also a continuation-in-part of application Ser. No. 08/452,509 filed 30 May 1995 pending.

BACKGROUND OF THE INVENTION

In one aspect the present invention relates to novel, improved, multi-function appliances.

In a more specific aspect the invention relates to appliances as characterized in the preceding paragraph which can be used to: (1) cook bagels by a sequence of boiling and baking steps, (2) prepare the bagel dough and other yeast doughs, and (3) make bread.

DESCRIPTION OF THE PRIOR ART

Bagels are ring-shaped rolls with a tough, chewy texture. They are prepared by first boiling and then baking a kneaded and proofed yeast dough.

Bagels have become a universal food; and automated, commercial scale machines for cooking them in large quantities are in widespread use. However, comparable bagel cooking devices suitable for home use are not available. Instead, the cook has to boil the bagels in a pan of water, remove and drain the boiled bagels, transfer the drained bagels to a baking sheet, and then bake the bagels.

Parent application Ser. No. 08/372,518 discloses novel devices which are scaled for home and other low volume applications and which greatly simplify the task of boiling and then baking the proofed and shaped bagel dough. Generally speaking, these appliances combine an electrically heated boiler with a convection oven into a single unit. A displaceable rack allows the uncooked bagels to be shifted into the boiler to boil them and to then be transferred into the oven section of the unit to complete the cooking process. A control unit operates the boiling and baking sections of the unit for appropriate user-selectable periods of time and warns the user when each of the two cooking steps is completed.

Companion application No. (Attorneys' Docket No. 2997) filed 30 May 1995 disclose related appliances which have: (a) all of the functions and advantages of those disclosed in parent application No. 08/372,518, and (b) are so designed that the bagel dough can be made and cooked in the same unit.

Many, if not most, of those with an interest in making bagels may also wish to bake their own bread. Even with the advances disclosed in copending applications Nos. 08/372, 518 and (Attorneys' Docket No. 2997), this requires two appliances—a bread maker and an appliance as disclosed in one or the other of the copending applications. Some may find this objectionable—for example, because of the cost and because of the space taken up by two separate appliances.

SUMMARY OF THE INVENTION

Now invented and disclosed herein are certain new and novel appliances which can be used to: (a) bake bread, (b) make bagel and other yeast doughs, and (c) cook bagels using the customary sequence of boiling and baking steps. Thus, one wishing to both make bread and bagels can do so with a single appliance, not the two appliances heretofore required. Also, the appliance can be employed to make yeast doughs for other foods—for example, dinner rolls, doughnuts, and the like.

To a considerable extent, the novel appliances disclosed herein resemble bread making machines, and they have all of the capabilities and functions of those devices. In addition, appliances employing the principles of the present invention are so constructed that the heater utilized in bread making to bake the bread dough can be utilized to heat water for boiling bagels; and a second, typically convection heater is provided. That heater is used to bake the boiled bagels. In addition, the appliances of the present invention have a removable rack and an operator-actuatable mechanism for displacing the rack between a boiling zone where the bread baking/water boiling zone is located and an oven zone where the second, bagel heater is located to complete the bagel cooking process. An operator-accessible control unit operates the bread baking/bagel boiling and bagel baking sections of the unit for appropriate user-selectable periods of time and warns the user when each of the two cooking steps is completed.

The objects, features, and advantages of the invention will be apparent to the reader from the foregoing and the appended claims and as the ensuing detailed description and discussion proceeds in conjunction with the accompanying drawings.

BRIEF DESCRIPTION OF THE DRAWINGS

FIG. 1 is an external view of a bread making and bagel cooking appliance embodying the principles of the present invention;

FIG. 2 is an exploded view of a bagel rack and rack support which are installed in an inner compartment of the appliance to ready it for cooking bagels;

DESCRIPTION OF A PREFERRED EMBODIMENT

Figure 4:
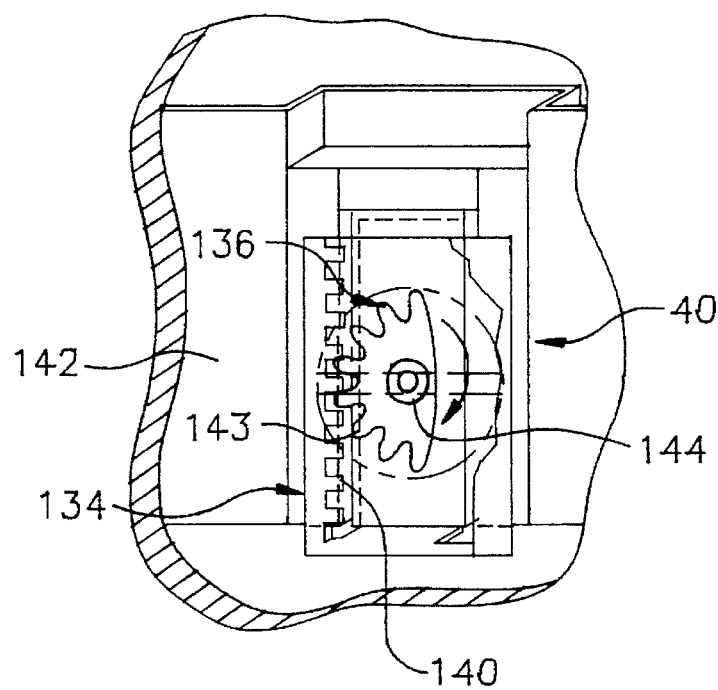
FIGS. 4 and 5 are fragmentary views of the FIG. 1 appliance showing rack and pinion components of a unit which allows the user to shift the bagel support structure between the boiler and oven sections of the bagel cooker.
Figure 5:
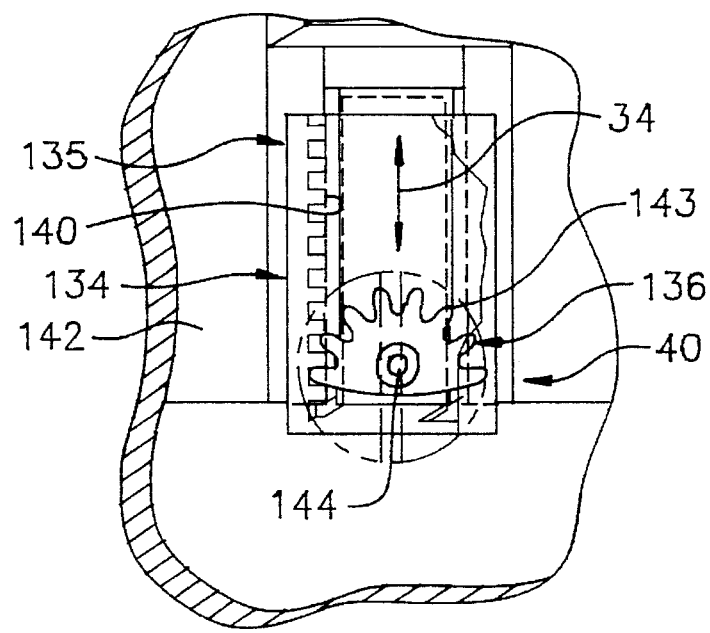

The drawings (FIGS. 1, 3, and 6–8) depict a dough and bread making and bagel cooking appliance 20 constructed in accord with, and embodying, the principles of the present invention. Appliance 20 includes a casing 22 with appliance-supporting feet 23 and a hinged cover 24. Housed in casing 22 and supported from the upper rim 26 of that casing is an imperforate, non-removable, inner casing 28 defining a compartment 29 in which yeast doughs can be mixed, kneaded, and baked. Compartment 29 has a lower zone 30 in which uncooked bagels are boiled (see FIG. 7) and an upper zone 32 in which the boiled bagels are subsequently baked (see FIG. 8). Supported in casing 28 for bidirectional, vertical movement as suggested by arrow 34 in FIGS. 5, 7, and 8 is a removable rack 36 on which the raw bagels are placed and an also removable rack support 38 which can be displaced in the arrow 34 directions by the rack and pinion mechanism 40 depicted in FIGS. 4 and 5.

Appliance 20 also includes a removable blade 44 which can be installed in appliance compartment 29 with rack 36 and rack support 38 removed to mix and knead bagel, bread, and other yeast doughs. Blade 44 is rotated by an electrical drive system identified in FIGS. 3 and 6–8 by reference character 46.

Figure 9:
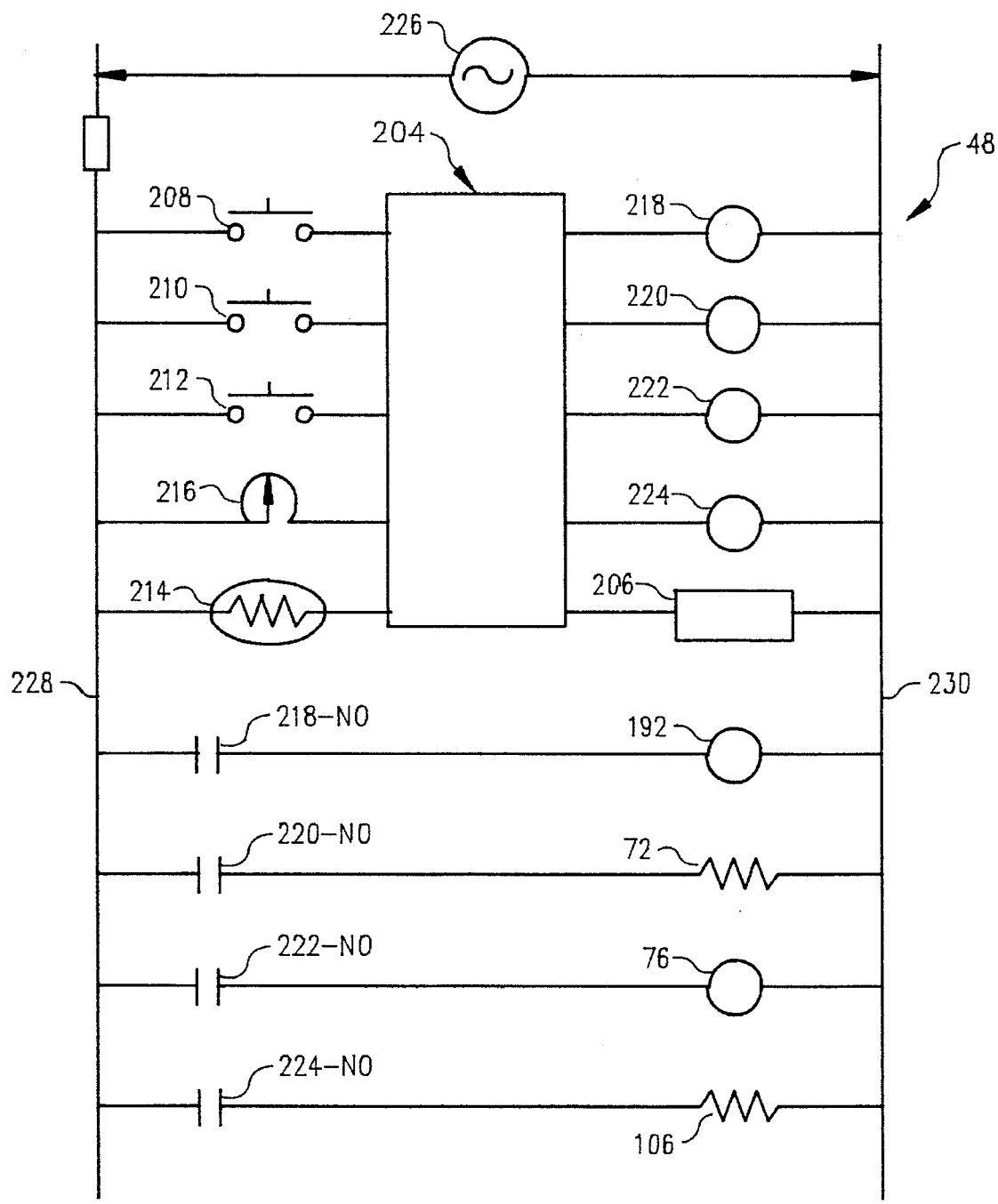
FIG. 9 is a circuit diagram of the appliance's electrical components.

The operation of appliance 20 is controlled by the system depicted in FIG. 9 and identified by reference character 48.

Referring still to FIGS. 1, 3, and 6–8, the outer housing or casing 22 of appliance 20 has a vertically oriented, cylindrical side wall 52 and a flat bottom wall 54. Side wall 52 and bottom wall 54 are preferably insulated to isolate a user from the high temperatures reached in the interior of the appliance during the operation of that device.

The cover or lid 24 of appliance 20 is a flat, circular, also preferably insulated component with a depending, integral flange 57 which fits around the periphery of outer casing side wall 52 adjacent the upper edge 26 of the casing. Lid 24 keeps hot gases and vapors from escaping the interior of appliance 20 and possibly injuring the user. However, cover 24 is not clamped to casing 22 to avoid a potentially dangerous buildup of pressure in the bagel cooker interior.

Figure 3:
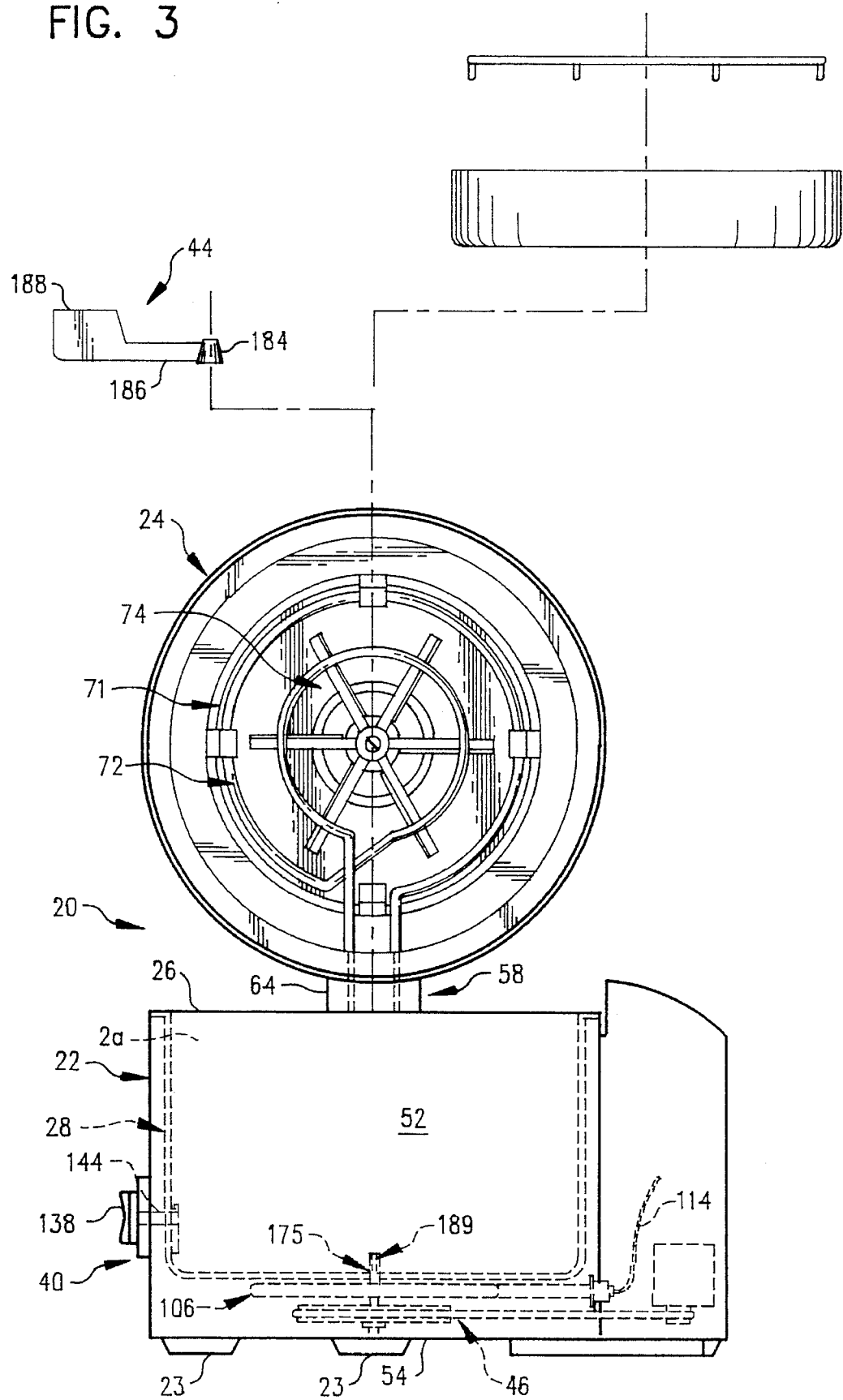
FIG. 3 is an exploded view showing certain internal components of the appliance as well as the steps used to ready the appliance for cooking bagels; viz., the removal of a dough mixing and kneading blade from the inner compartment of the appliance and the replacement of that component with the bagel rack and rack support.

As shown in FIGS. 1–3, a hinge 58 supports cover 24 from outer casing side wall 52 for pivotable movement between closed and open positions. Hinge 58 includes one leaf 62 fixed to the peripheral flange 57 of cover 24 and a second, complementary leaf 64 mounted to the side wall 52 of outer casing 22. The two hinge leafs 62 and 64 are connected by a conventional pivot pin 68. Hinge 58 will also typically include an overcenter mechanism (not shown) for retaining cover 24 in the open position.

The cover 24 of bagel cooker 20 supports a cover 70 for permanently installed, compartment defining, inner casing 28 and a convection heating unit 71 which includes heating coil 72, convection fan 74, fan motor 76, and motor cooling fan 77. Convection heating unit 71 is employed with rack 38 in an elevated position (FIG. 8) to bake in compartment 29 bagels which have previously been boiled with appliance 20 configured as shown in FIG. 7.

Convection heating unit fan 74 is assembled to the lower end of the vertically extending fan motor output shaft 78, and motor cooling fan 77 is fixed to the upper end of the motor output shaft. The convection fan is surrounded by a protective shroud 80 with an open lower end 82 which allows fan 74 to circulate air inducted into casing 22 through louvered inlet 83 into the second, upper, baking zone 32 of compartment 29.

Heating element 72 is typically a conventional resistance heater configured to surround the shaft 78 of fan motor 76. Heater 72 is assembled in any convenient manner to inner casing cover 70 between and in spaced relationship to cover 70 and the top 84 of fan shroud 80. This allows air to be circulated first over heater 72 to increase its temperature, then downwardly past fan shroud 80, and then up through bagel-supporting rack 36 to bake the bagels 86. The circulation pattern is depicted by the arrows collectively identified by reference character 88 in FIG. 8.

Before the bagels 86 are baked, however, they are first boiled as is conventional in cooking bagels. This step is carried out in the first, lower, boiling zone 30 of appliance 20 in a body 90 of boiling water contained in appliance compartment 29. The inner casing 28 defining compartment 29 has an open top; a panlike configuration defined by a cylindrical side wall 94; and a flat, integral, circular bottom wall 96.

Appliance inner casing 28 is supported from outer casing 22 by an integral, outwardly directed, circumferentially extending flange 98 attached to and located at the upper end 100 of inner casing side wall 94. With the cover 24 of bagel cooker 20 closed, flange 98 rests on the upper end 26 of outer casing side wall 52. This forms a primary seal to isolate the user from hot gases and vapors generated in the interior of appliance 20 during the operation of that device.

Figure 6:
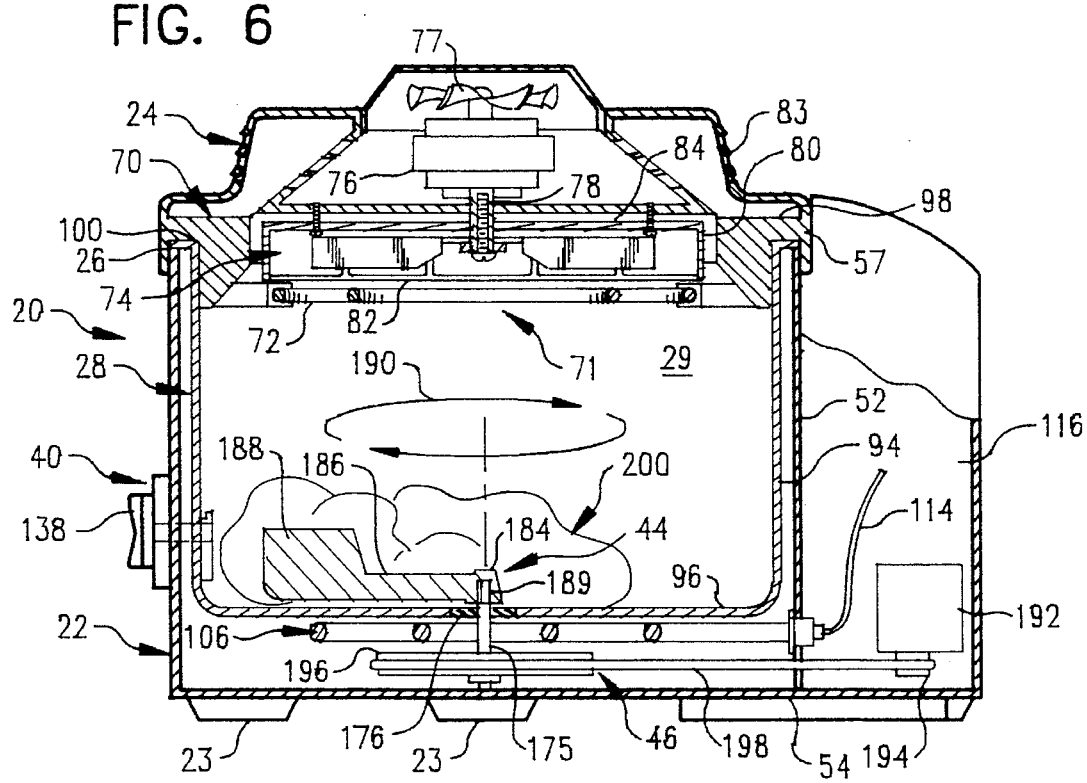
FIG. 6 is a vertical cross-section through the appliance as configured for making bread; i.e., for mixing and kneading the bread dough and subsequently baking the dough; the appliance can also be used in this configuration to make dough which can be removed from the appliance, shaped, and cooked else-where.
Figure 7:
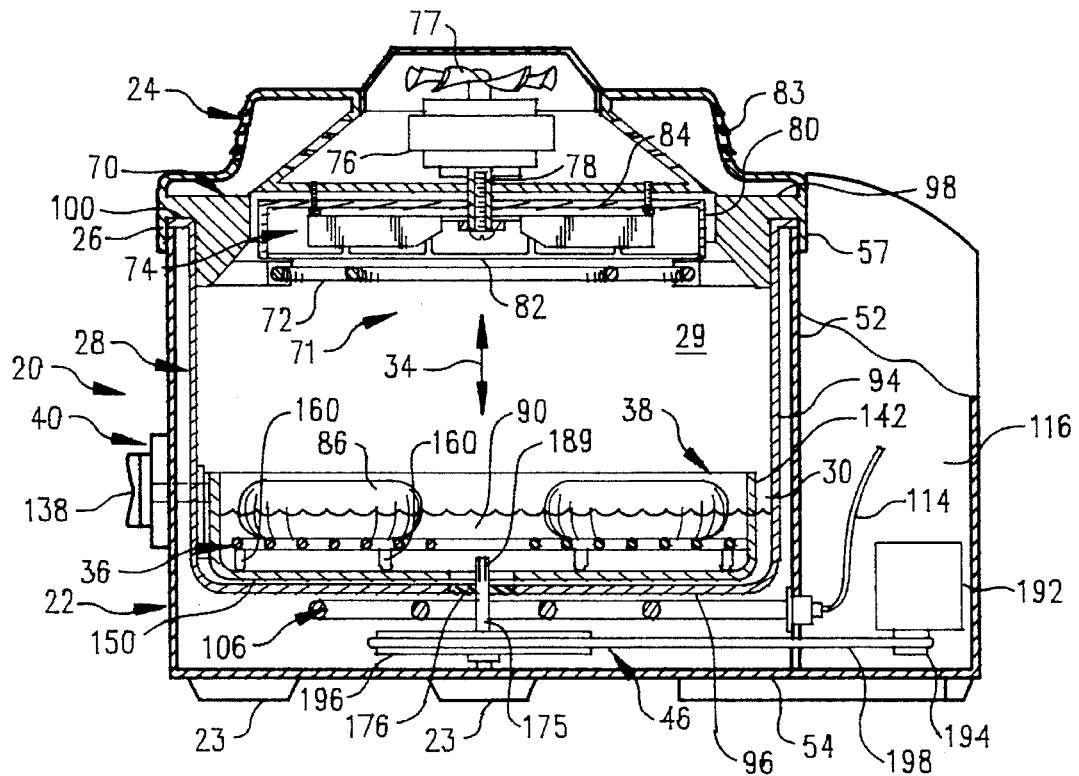
FIG. 7 is a view like FIG. 6 but with the mixing/kneading blade removed and the bagel rack and rack support installed and lowered to a first heating zone in the lower reaches of the appliance's inner compartment to boil bagels placed on the rack.
Figure 8:
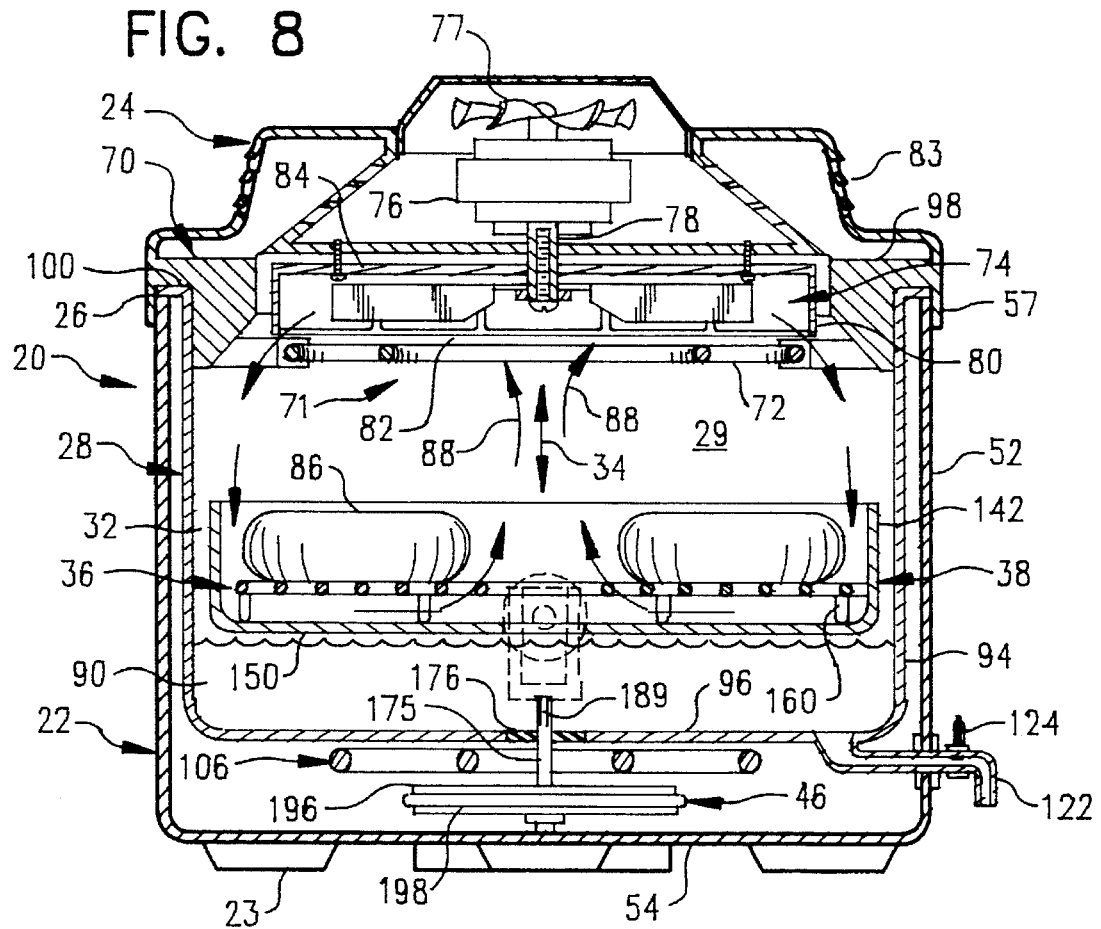
FIG. 8 is a view like FIGS. 6 and 7 but with the bagel rack and support displaced to an elevated position to bake the boiled bagels.

Referring now to FIGS. 3 and 6–8, the water 90 in appliance compartment 29 is boiled by a resistance heater 106 which is installed in outer casing 22 subjacent the bottom wall 96 of inner casing 28. Heater 106 is also used to bake bread when appliance 20 is configured as shown in FIG. 6 and used for bread making.

Heater 106 operates on electrical energy supplied through a line 114 extending from the heater into a cavity 116 in appliance outer casing 22 and upwardly through cavity 116 to a top mounted control box (not shown) which houses appliance control system 48 and has an externally accessible control panel 120.

Gases generated by the boiling of the water 90 in appliance inner compartment 29 have the potential of causing a potentially dangerous buildup of pressure in the interior of the appliance. This buildup of pressure can be avoided by employing a vent system (not shown) of the character disclosed in parent application Ser. No. 08/372,518.

After appliance 20 has been used for cooking bagels, the water 90 is drained from compartment 29 through a line 122 extending from the bottom wall 96 of inner casing 28 to the exterior of outer casing 22. An otherwise closed valve 124 in drain line 22 is opened to drain the water.

Referring now to FIGS. 1 and 3–8, the cam mechanism 40 provided in appliance 20 to move bagel-supporting rack 36 in the arrow 34 directions between boiling zone 30 and baking or oven zone 32 includes an elongated rack 134, a pinion 136, and an external operator or knob 138. Rack 134 has the customary teeth 140. Cam mechanism rack 134 is attached in a vertical orientation and in any convenient manner to the side wall 142 of the support 38 for bagel rack 36.

Pinion 136 has teeth 143 which mesh with the teeth 140 on rack 134. Pinion 136 is attached to the inner end of a shaft 144 which extends through the side wall 94 of appliance inner casing 28 and the side wall 52 of outer casing 24 and is rotatably supported in side wall 52. Knob 138 is fixed to the outer end of shaft 144 for rotation with the shaft. Consequently, rotation of knob 138 in the counterclockwise direction (as shown in FIGS. 1 and 3) will move cam mechanism rack 134, bagel rack support 38, and bagel rack 36 downwardly in appliance inner casing 28 toward and to the boiler zone 30 in compartment 29. Conversely, rotation of external knob 138 in the opposite, clockwise direction will move the cam mechanism rack, bagel rack support, and bagel rack upwardly into the oven zone 32 in the appliance. Friction or a detent arrangement between knob 138 and outer casing side wall 52 (not shown) can be employed to retain the bagel rack support, the bagel rack, and the bagels 86 being baked in the oven zone 32 of appliance 20.

The details of the bagel rack and its support thus raised and lowered by cam mechanism 40 are not critical. In the exemplary, illustrated embodiment of the invention, the rack support 38 is an open top, sheet metal component with an indentation 148 in its side wall 142. That indentation accommodates the rack 134 of cam mechanism 40 (see FIGS. 2, 4, and 5). The bagel rack support also has a flat bottom wall 150 with a set of openings 152 through which water heated by resistance element 106 can circulate to boil the bagels 86 being cooked.

Bagel rack 36 is a flat array of concentric rings or rods 154a–154h with the outer ring 154a being interrupted to accommodate that segment 156 of rack support side wall 142 bounding the inner end of the indentation 148 in which the rack 134 of cam mechanism 40 is mounted. Rings 154a–154h are maintained in the illustrated concentric configuration by bonding them to equiangularly arranged, radially extending rods 158a–158f. The outer ends of rods 158a–158f are bent downwardly to form legs 160. These legs support the flat array of rings 154a–154h in spaced relationship to the bottom wall 150 of bagel rack support 38. This allows boiling water 90 to freely circulate up through the openings 152 in the bottom 150 of the bagel rack support and into contact with the bagels 86 being boiled. The interstices in the array of rings 154a–154h allow the boiling liquid to freely reach the bagels.

As discussed above, a significant advantage of the present invention is that the same appliance 20 can be used to: (1) make bagel dough (and other yeast doughs); (2) to bake dough prepared in appliance 20 or elsewhere into bread; and (3) to boil and then bake bagels into which dough made in the appliance is shaped. Appliance 20 can equally well be employed to boil and then bake otherwise obtained, uncooked bagels such as those available in the frozen food sections of supermarkets and other stores. It was also pointed out that these bread making and bagel cooking functions are provided by equipping appliance 20 with a bagel rack 36 and rack support 38 which are installable in and removable from compartment 29, an also removable dough mixing and kneading blade 44, and the electric motor-powered drive system 46 for rotating blade 44.

To make dough in appliance 20, bagel rack 36 and its vertically displaceable support 38 are removed, and mixing/kneading blade 44 is installed on the upper end of a vertically oriented driven shaft 175 of the drive system 46 for blade 44 (see FIGS. 3 and 6). A spacer component 176 isolates the bottom wall 96 of appliance inner casing 28. This keeps vibration from being transmitted to other components of appliance 20. Component 176, which is installed in inner casing bottom wall 96, also serves as a bushing for the driven shaft 175 of dough blade drive system 46.

Dough mixing and kneading blade 44 (shown in FIGS. 3 and 6) is of conventional construction. This component has a hub 184, an integral arm 186 extending radially from hub 184, and an also integral blade 188 at the outer end of arm 186.

Blade 44 is installed by pressing its hub 184 downwardly onto the upper end of driven shaft 175. This couples internal splines in the hub (not shown) with vertically oriented, external splines 189 at the upper end of the rotatable driven shaft 175, thus drive-connecting blade 44 to the driven shaft for rotation therewith as indicated by arrows 190 in FIG. 6.

In addition to the driven shaft 175 just described, the system 46 employed to rotate dough mixing and kneading blade 44 includes an electric motor 192 housed in the cavity 116 between the appliance outer and inner casings 22 and 28. The output shaft of this motor (not shown) is drive-connected to blade-rotating driven shaft 175 via a pulley 194 on the motor output shaft; a pulley 196 assembled to the lower end of, and rotatable with, shaft 175; and a flexible endless belt 198 extending between, and trained around, pulleys 194 and 196.

In its dough making mode, appliance 20 functions in a manner akin to that of bread making machines. The dough ingredients—basically water, yeast, flour, and salt and, typically, a solid or liquid fat employed as a dough enhancer and conditioner—are added to dough container 42. Next, blade 44 is rotated to first mix and then knead the bread dough ingredients. The dough 200 is then allowed to rest and rise. If bread is being made, the dough will typically be punched down, allowed to rise for a second time, and then baked in appliance compartment 29 by so turning on heater 106 as to maintain the temperature in compartment 29 at a selected bread baking level for the appropriate period of time.

If bagels, rolls, doughnuts or other non-loaf items are being made, the dough will typically be removed from appliance compartment 29 after it has risen for the first time. The risen dough is punched to release gas built up in the dough, formed into bagel or other shapes, set aside to rise for a second time, and baked in an oven.

Turning now to FIG. 10, the control system 48 of appliance 20 regulates the operation of: the mixing/kneading blade drive motor 192, the bread baking/water boiling, resistance heater 106 for zone 30 of appliance 20, and the bagel baking heater 72 and fan 74 in convection oven zone 32. The control circuit includes: a microprocessor-based controller 204 and a display 206 along with SELECT, START, and RESET switches 208, 210, and 212.

Select switch 208 is used to choose a particular setting from those made available by controller 204. Typical settings and their stages are:

TABLE 1

| Setting | Stages |
| --- | --- |
| Basic, French, Sweet, and Bagel Dough Preparation | Mix |
| | First Knead |
| | Rest |
| | Second Knead |
| | Rise |
| Whole Wheat and Whole Wheat Bagel Dough Preparation | Mix |
| | Rest |
| | Knead |
| | Rise |
| | Punch |
| | Rise |
| Make and Bake Basic, French, and Sweet, Dough | Mix |
| | First Knead |
| | Rest |
| | Second Knead |
| | Rise |
| | Shape |
| | Final Rise |
| | Bake |
| | Cool |
| Make and Bake Whole Wheat Dough | Mix |
| | Rest |
| | Knead |
| | Rise |
| | Punch |

TABLE 1-continued

| Setting | Stages |
| --- | --- |
| | Rise |
| | Shape |
| | Final Rise |
| | Bake |
| | Cool |
| Make and Cook Basic Bagels | Mix |
| | First Knead |
| | Rest |
| | Second Knead |
| | Rise |
| | Shape |
| | Final Rise |
| | Boil |
| | Bake |
| Make and Cook Whole Wheat Bagels | Mix |
| | Rest |
| | Knead |
| | Rise |
| | Punch |
| | Rise |
| | Shape |
| | Final Rise |
| | Boil |
| | Bake |
| | Cool |
| Cook Bagels from Supermarket and Other Sources | Boil |
| | Bake |

The following table describes what happens in each of the stages identified in Table 1:

TABLE 2

| Stage | Function |
| --- | --- |
| Mix | Mixes ingredients by rotating dough blade 44 three-quarters of a turn, then pausing 2 seconds, and repeating the turn-pause cycle until the ingredients are thoroughly combined |
| Knead | Kneads the dough |
| Rest | This avoids overworking of basic, sweet, and French bread doughs, promotes dampening of whole wheat doughs, and furnishes time for the compartment 29 of appliance 20 to heat |
| Rise | Allows gases to be generated to increase the bulk of and make the dough lighter |
| Punch | Releases excess gases accumulated in the dough in the first Rise stage, avoiding large pockets or holes and uneven texture |
| Shape | Imparts the wanted configuration to the dough |
| Final Rise | Makes the dough lighter by generating gases replacing those expelled in the Punch stage |
| Bake | Cooks the dough, imparting pleasing organoleptic properties and aroma |
| Boil | Imparts the "chewy" texture to bagel dough |
| Cool | Keeps the bread or bagels warm enough to prevent sogginess |

START switch 210 is employed to initiate the selected operation, and STOP switch 212 is closed to cancel a mistake in programming appliance 20 or to stop the operation of the appliance.

PCB-based controller 204 has two inputs in addition to the SELECT, START, and STOP switches just described. These are a temperature sensor 214 and a operator-employable temperature controller 216. The latter is employed to select the appropriate compartment 29 temperature for baking bread. Oven sensor 214 continuously reports to the controller on the temperature in working compartment 29 of the appliance.

Controller 204 can also be programmed by SELECT switch 208 to turn on both lower heater 106 and upper heater 72 in all available bread baking cycles. This may advantageously reduce the baking time and produce a more uniformly baked, higher quality product.

The outputs from PCB-based controller 204 are relays 218, 220, 222, and 224. These four relays have normally opened contacts 218-NO, 220-NO, 222-NO, and 224-NO, which are respectively wired in series with the motor 192 of mixing/kneading blade drive system 48, the heating coil 72 of convection heating unit 71, the motor 76 of the fan 77 in that convection heating unit, and the bread baking/bagel boiling heater 106 in the lower reaches of appliance 20.

The several electrical and electrically-operated components of appliance 20 just described are connected across an AC power source 226 by way of main leads 228 and 230 and the several branch leads shown in FIG. 9.

In its dough making mode, appliance 20 functions in a manner akin to that of a bread making machine as will be apparent to the reader from Tables 1 and 2. If bread is being made, appliance 20 also bakes the dough like a bread making machine does. The making of bagels differs in that, after the dough 232 (FIG. 6) has risen and been shaped, the uncooked bagels 234 are loaded onto bagel rack 36. External knob 138 is then rotated to lower the rack into the water 90 in the bottom of the working compartment 29 of appliance 20. START button 210 is then depressed to initiate the Boil stage in which heater 106 is turned on by controller 204 for the period of time required to bring water 90 to the boil and to then boil the bagels for an appropriate length of time. When the selected time elapses, a buzzer (not shown) sounds, and the user rotates knob 138 to elevate bagel rack 36 and the now boiled bagels to the convection oven section 32 of appliance 20 (see FIG. 8). Then, with SELECT button or switch 208 having been depressed to set the baking time and temperature, START switch 210 is closed to initiate the baking cycle. The buzzer sounds again when the baking time elapses, and heater 72 is turned off. The operator of appliance 20 then opens the cover 24 of the appliance and employs an accessory such as the one disclosed in parent application Ser. No. 08/372,518, a pair of tongs, etc. to remove bagel rack 36 and the now baked bagels 86 from the bagel cooker.

Many modifications in the illustrated and above-discussed embodiment may of course be made without exceeding the scope of the present invention. The invention may thus be embodied in many forms without departing from the spirit or essential characteristics of the invention. The present embodiment is therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A bread making and bagel cooking appliance which comprises:

an outer casing;

an inner casing with a compartment in which dough can be made and baked, said inner casing being irremovably installed in said outer casing;

dough mixing and kneading means removably installable in said compartment;

means providing a first, dough making, bagel boiling, and bread baking zone in said compartment;

means providing a second, bagel baking zone in said compartment;

a bagel support means removably installable in said compartment; and means housed in said compartment and operable with said support means installed for first shifting said support means to said first zone to boil uncooked bagels on said support means and then to said second zone to bake the boiled bagels.

2. An appliance as defined in claim 1 which comprises:

a heater means for said first zone and means accessible from the exterior of said outer casing for so controlling the operation of said heater means as to regulate: (a) the duration of a bagel boiling cycle, and (b) the temperature in said compartment and the duration of a baking cycle for dough being baked in said compartment.

3. A bread making and bagel cooking appliance as defined in claim 2 which comprises:

a second, independently operable heater means for said second, bagel baking zone; and means accessible from the exterior of said outer casing for so controlling the operation of said second heater means as to regulate the temperature in said second zone and the duration of operation of said heater means.

4. An appliance as defined in claim 3 which comprises a fan which is associated with said second zone and which is so electrically connected that the fan is operated concomitantly with said second heater means.

5. An appliance as defined in claim 1 which comprises an actuator for said shifting means, said actuator being accessible from the exterior of said casing.

6. An appliance as defined in claim 5 which comprises a fan which is associated with said second zone and which is so electrically connected that the fan is operated concomitantly with said second heater means.

7. An appliance as defined in claim 1 which comprises a drive means for said dough mixing and kneading means, said drive means being housed in said outer casing.

8. An appliance as defined in claim 7 which comprises means accessible from the exterior of said outer casing for controlling the operation of said drive means.

9. An appliance as defined in claim 1 in which:

the first zone is located in the lower reaches of the inner compartment and the second zone is located above the first zone; and the means for shifting said support means comprises a toothed rack assembled to the support means, a pinion having teeth meshed with the teeth on said rack, shaft means rotatably supporting said pinion from said external casing, and means accessible from the exterior of the outer casing for rotating said shaft.

10. An appliance as defined in claim 1 in which at least the lower part of the inner compartment is watertight.

11. An appliance as defined in claim 10 which has a drain communicating with the interior of the inner compartment at the bottom thereof and a valve in said drain.

12. An appliance as defined in claim 1 which includes:

a first cover means cooperable with the outer casing to isolate the interior of the appliance; and a second cover means for said inner compartment, said second cover means being supported from said first cover means.

13. An appliance as defined in claim 12 which includes a heater means and a fan, both supportable from said first cover means in the first zone of the inner compartment.

14. An appliance as defined in claim 1 which comprises:

a first heater means for said first zone;

a second heater means for said second zone; and means employable by a user to independently control the operation of said first and second heater means.

15. An appliance as defined in claim 14 in which the user-employable control means comprises user-manipulatable means for routing electrical energy to a user-selected one or both of said first and second heater means, user-settable means for timing the operation of the selected heater means, and user-adjustable means for so controlling the operation of the second heater means as to maintain a selected baking temperature in said second compartment zone.

16. An appliance as defined in claim 1 which comprises:

an electrical heater means for each of said first and second zones;

an electrically powered drive system for the dough mixing and kneading means;

a programmable controller for said heater means and said drive system; and user-actuatable means for programming said controller.

* * * * *